March 3, 1936.　　　H. KOZIKOWSKI　　　2,032,537
NIGHT FISHING DEVICE
Filed March 12, 1935
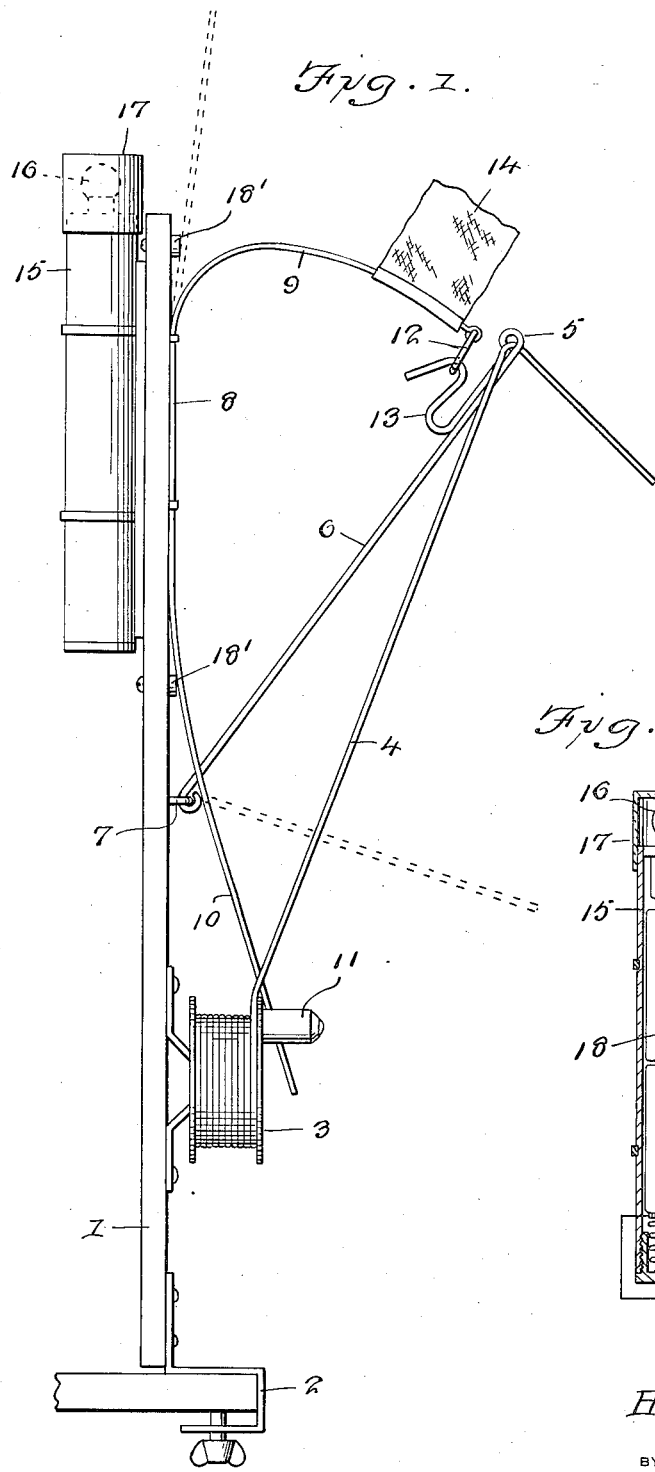
Henry Kozikowski
INVENTOR
BY Victor J. Evans & Co.
ATTORNEY Patented Mar. 3, 1936

2,032,537

UNITED STATES PATENT OFFICE 2,032,537

NIGHT FISHING DEVICE

Henry Kozikowski, West Springfield, Mass.

Application March 12, 1935, Serial No. 10,733

3 Claims. (Cl. 43—16)

This invention relates to a device for night fishing and has for the primary object the provision of means for automatically displaying a visible signal when the fish strikes or bites the bait on the hook of a fishing line and provides means for supporting the line and its reel on a boat or any other suitable support so that the fisherman may leave the line unattended until such time a fish has become caught on a hook.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a fishing device constructed in accordance with my invention.

Figure 2 is a fragmentary side elevation illustrating the device.

Figure 3 is a fragmentary sectional view showing the electrical signal.

Referring in detail to the drawing, the numeral 1 indicates a vertically arranged post carrying at its lower end a clamp 2 connecting the post to a suitable support. A reel 3 is mounted on the post 1 adjacent the support and has a fishing line 4 mounted thereon. The fishing line after leaving the reel 3 passes through an eye 5 formed on the free end of an arm 6, the latter being hinged to the post 1 above the reel 3, as shown at 7. A flexible strip 8 is secured to the post and provides flexible end portions 9 and 10. The portion 10 contacts with the reel 3 and acts as a stop for the latter by lying in the path of movement of the handle 11 of said reel. The end portion 9 carries a ring 12 to engage with a hook 13 on the arm 6. The ring 12 when in engagement with the hook 13 will maintain the portion 9 in a bowed position and when the line or the hook (not shown) carried by the line is pulled upon by the fish the arm 6 will be pulled downwardly disengaging the hook from the ring 12 and permitting the end portion 9 to assume a substantially vertical position. A signal in the form of a flag, as shown at 14, is carried by the flexible end portion 9 for the purpose of attracting attention to the movement of said portion 9 when freed from the bowed position rendering the device useful in the daytime.

An electrical signal 15 is mounted on the post 1 and is in the form of a flashlight, the electric lamp being indicated by the character 16, and may be protected by a removable cover 17. The circuit of the electric lamp between the latter and its electrical supply 18 is provided with spaced contacts 18', one of which is in engagement with the flexible strip at all times while the other contact is engaged and disengaged by the flexible end portion 9 in accordance with the positions occupied during the use of the device. The flexible end portion 9 when in a bowed position is disengaged from the contact adjacent thereto so as to break the circuit to the electric lamp and when a fish bites or strikes at the bait on the hook and thereby frees the end portion 9, the latter moves into engagement with the respective contact, completing the circuit to the electric lamp and thereby giving a visible signal to the fisherman at night time. The flexible end portion 10 engaging the handle of the reel 11 prevents the reel from unwinding when the fish pulls upon the line so that the line will cause a downward swinging movement of the arm 6 and thereby free the hook from the ring.

Having described the invention, I claim:

1. A fishing device comprising a post, means for securing the post to a support, a reel carried by the post, a fishing line carried by the reel, an arm hinged to the post and having an eye with the line passing therethrough, a flexible element secured to the post and providing free flexible end portions, one of said end portions forming a stop for the reel, a ring carried by the other flexible end portion, and a hook carried by the arm to engage with the ring for holding said last-named end portion in a bowed position and to free the latter upon a fish pulling on the line, said last-named end portion forming a signal.

2. A fishing device comprising a post, means for securing the post to a support, a reel carried by the post, a fishing line carried by the reel, an arm hinged to the post, and having an eye with the line passing therethrough, a flexible element secured to the post and providing free flexible end portions, one of said end portions forming a stop for the reel, a ring carried by the other flexible end portion, a hook carried by the arm to engage with the ring for holding said last-named end portion in a bowed position and to free the latter upon a fish pulling on the line, and an electrical signal carried by the post and including an electric circuit to be closed by the last-named end portion assuming a neutral position after being freed from the hook.

3. A fishing device comprising a post, means for securing the post to a support, a reel carried by the post, a fishing line carried by the reel, an arm hinged to the post and having an eye with the line passing therethrough, a flexible element secured to the post and providing free flexible end portions, one of said end portions forming a stop for the reel, a ring carried by the other flexible end portion, a hook carried by the arm to engage with the ring for holding said last-named end portion in a bowed position and to free the latter upon a fish pulling on the line, an electrical signal carried by the post and including an electric circuit to be closed by the last-named end portion assuming a neutral position after being freed from the hook, and a signal element carried by the last-named flexible end portion.

HENRY KOZIKOWSKI.